(12) United States Patent
Schutz

(10) Patent No.: US 9,016,880 B2
(45) Date of Patent: Apr. 28, 2015

(54) OPTICAL DEVICE WITH TWO CYLINDRICALLY SYMMETRIC MIRRORS

(71) Applicant: Ronald Joseph Schutz, Exeter, NH (US)

(72) Inventor: Ronald Joseph Schutz, Exeter, NH (US)

( * ) Notice: Subject to any disclaimer, the term of this patent is extended or adjusted under 35 U.S.C. 154(b) by 341 days.

(21) Appl. No.: 13/720,558

(22) Filed: Dec. 19, 2012

(65) Prior Publication Data

US 2014/0168803 A1    Jun. 19, 2014

(51) Int. Cl.
*G02B 17/06* (2006.01)
*B29D 11/00* (2006.01)
*B60R 1/10* (2006.01)

(52) U.S. Cl.
CPC ...... *G02B 17/0615* (2013.01); *B29D 11/00596* (2013.01); *B60R 1/10* (2013.01)

(58) Field of Classification Search
CPC . G02B 17/0615; B60R 1/10; B29D 11/00596
See application file for complete search history.

(56) References Cited

U.S. PATENT DOCUMENTS

| | | | | |
|---|---|---|---|---|
| 2,819,649 A * | 1/1958 | McLeod et al. | | 362/298 |
| 4,033,678 A | 7/1977 | Rudd | | |
| 4,357,075 A * | 11/1982 | Hunter | | 359/858 |
| 2006/0061894 A1 * | 3/2006 | Li | | 359/858 |
| 2006/0256564 A1 * | 11/2006 | Li | | 362/341 |
| 2006/0274438 A1 * | 12/2006 | Li | | 359/858 |

* cited by examiner

*Primary Examiner* — Jennifer L Doak

(57) ABSTRACT

An advantageous optical apparatus with relatively large field viewing of an image to the rear of an observer is disclosed. The apparatus has two mirrors having cylindrical symmetry where the mirrors are positioned so that a plane of symmetry for each mirror is substantially coincident. The mirrors are further configured so that the apparatus has an astigmatism less than 0.0035, and a ratio between the far field and the near field magnification of less than 0.9. The apparatus is fabricated, in one embodiment, by using force to conform a thin polymer mirror onto an appropriate surface configuration on a monolithic block.

15 Claims, 4 Drawing Sheets

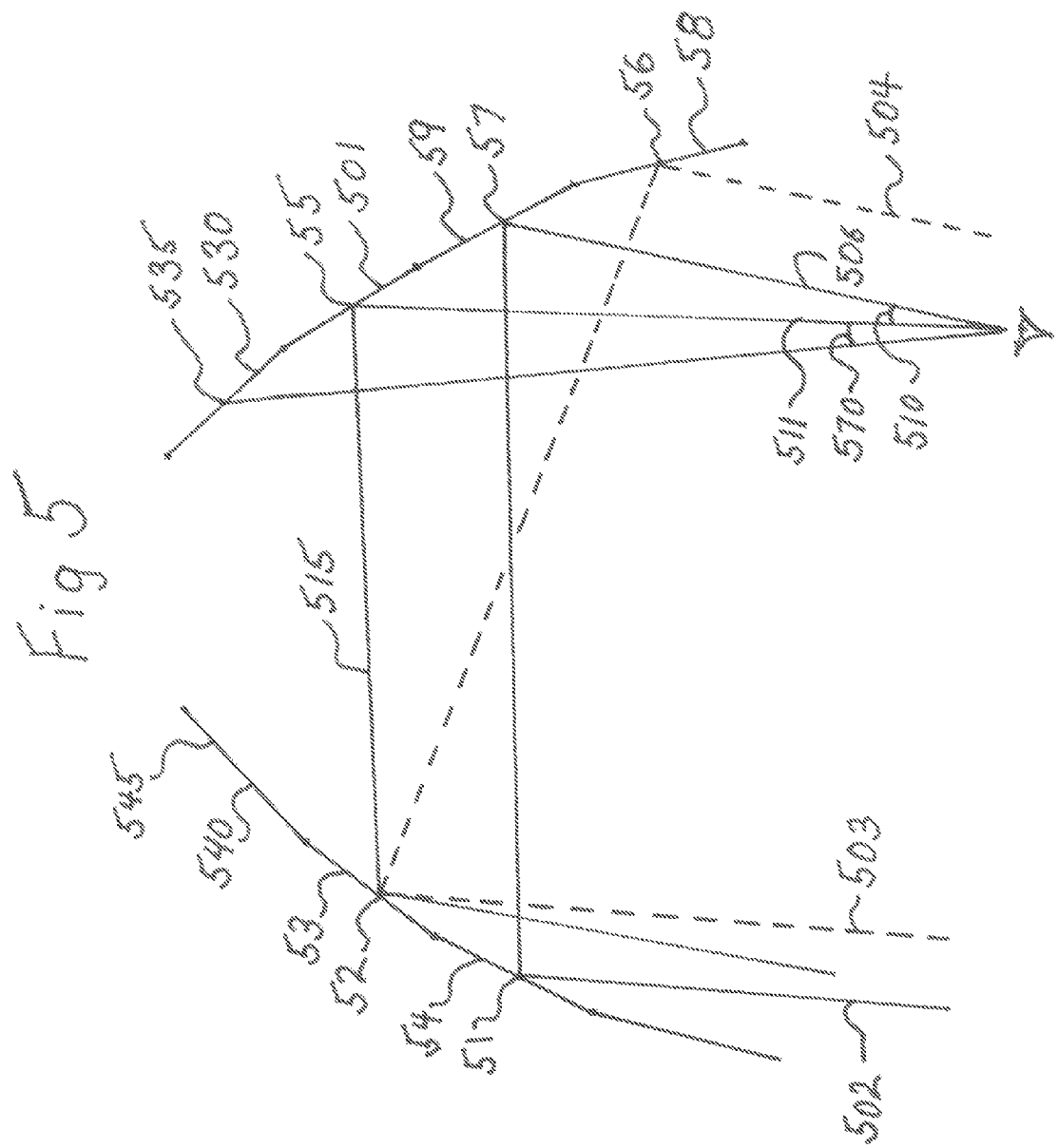

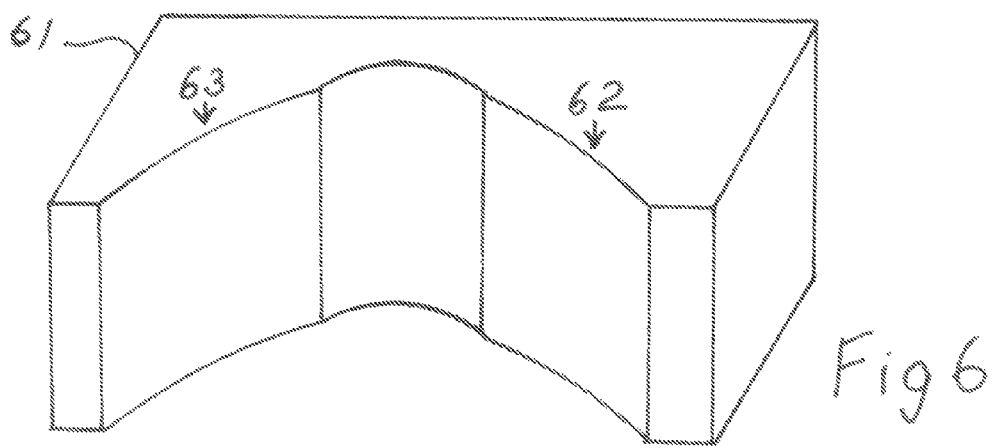
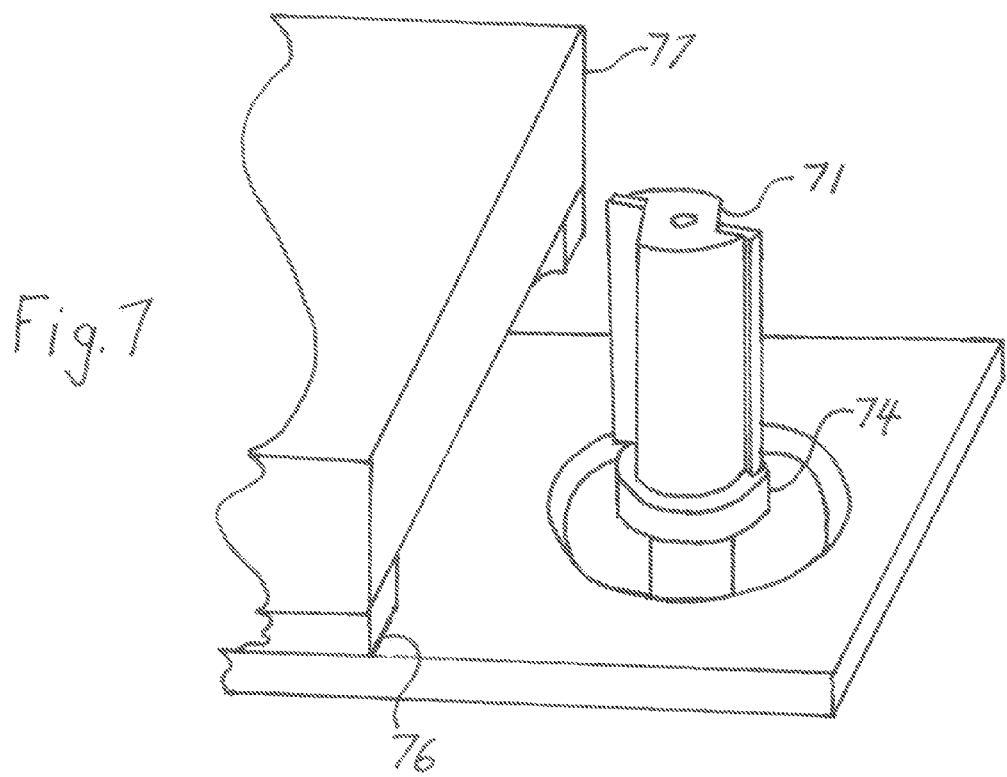

OPTICAL DEVICE WITH TWO CYLINDRICALLY SYMMETRIC MIRRORS

TECHNICAL FIELD

This invention relates to optical devices and more particularly optical devices allowing viewing of an optional field to the rear of an observer.

BACKGROUND OF THE INVENTION

Many devices have been developed to allow a user to view an image that is to the user's rear. Common examples of such devises are rear-view mirrors in cars and mirror attachments to bicycle helmets. Another similar but somewhat more demanding use involves viewing a rearward image while, for example, rowing a boat. In this situation the traveling direction to the rear of the observer as compared to the front presents further complications associated with the difficulty in making sudden changes of direction. This difficulty makes essentially continuous observation of direction crucial. Typical viewing approaches have involved essentially flat mirrors mounted in the vicinity of the observer, e.g. side or rear-view mirrors in a car and rear viewing contrivances for a bicycle or small boat.

For an apparatus having a simple flat mirror, a viewing angle limited to approximately 15 degrees of arc is not uncommon. This constricted viewing angle presents many inconveniences and even some safety issues. For example, mounting a small mirror on a bicycle safety helmet to the left of the user's left eye (in the case of riding on the right side of the road), blocks as much of the forward view as it provides a rearward image. Additionally, in the unfortunate event of an accident the mirror and supporting structure have the potential for being a dangerous projectile. These difficulties associated with typical bicycle mirrors are certainly not offset by their extremely limited rear viewing angle. Similar considerations are involved with rear-viewing equipment used in small boat applications.

Although the safety concerns previously discussed are not present for rearview equipment in cars, there is a similar limitation on viewing angle. Additionally, for many vehicles such as trucks the rear viewing structure is typically mounted so that it significantly projects from the side of the vehicle. This projection is necessary so that the vehicle itself does not block the line of sight to rearward images. The presence of such structures well beyond the limits of the vehicle's perimeter at times presents a safety hazard to, for example, pedestrians and at the least, often makes negotiating narrow byways very difficult.

Attempts have been made to increase the rearward viewing angle, for example, to between 20 and 45 degrees. One such approach involves de-magnifying the rearward view over the entire range of the image. Although this demagnification provides a larger viewing field, it also leads to a misperception of the distance between the viewer and the object being observed. The resulting difficulties in distance approximation certainly make the act of driving more challenging.

In an attempt to address difficulties with single-mirror approaches, multiple mirror configurations have been employed. Nevertheless, equipment with multiple flat mirrors still have significant problems such as inversion or rotation of the image, reduced image brightness, added complications, and increased physical size. Thus, configurations employing multiple, typically two, cylindrical mirrors have been proposed. For example, one such approach is disclosed in U.S. Pat. No. 4,033,678 dated Jul. 5, 1977. In this patent a rearward viewing device having two cylindrical mirrors is described. The cross-sectional shape of each mirror is specifically adjusted to maintain magnification at essentially unity horizontally across the apparatus while essentially eliminating astigmatism. For example, the use of an elliptical cross section having a focal ratio of two is explicitly exemplified. Despite an asserted improvement in viewing characteristics, the design procedure for accomplishing the specified characteristics involves multiple limitations including a complicated trial and error design process and a limitation of viewing angle.

Therefore, a device that is relatively easy to design as well as fabricate, that allows observation of a relatively wide rearward image, that need not project excessively beyond the user's confines, and that avoids viewing artifacts would be quite desirable.

SUMMARY OF THE INVENTION

Despite past failure, it is possible by employing two cylindrical mirrors to produce an apparatus with a relatively wide viewing angle, that does not induce spatial confusion and that does not require wide projection from the user. Such advantageous results are achieved by limiting astigmatism, maintaining a magnification in the vertical direction over the whole viewing angle of the device at approximately unity, but allowing the magnification in the horizontal direction to vary, e.g., to continuously decrease, as the viewing angle extends further to the side of the observer. Surprisingly, this arrangement despite a variation in horizontal magnification provides a realistic assessment of object distances while also furnishing an impression of objects generally well beyond the typical viewing angle. Thus, it allows objects to be discerned at wide viewing angles without providing a misleading estimate of the object's distance from the viewer.

The use of a two cylindrical mirror system having varying horizontal magnification and limited astigmatism also permits the apparatus to be placed in an advantageous position, e.g. directly in front of, or slightly above, a bicyclist's eye or relatively close to the side of a truck. Indeed, in the case of a bicycle it is possible by use of the subject invention to view the forward direction with one eye and the rearward direction with the other. Additionally it is possible to design an apparatus within the subject invention by a relatively straightforward iterative process and to manufacture this design using available expedients.

BRIEF DESCRIPTION OF THE DRAWINGS

FIGS. 1 to 5 illustrate concepts associated with the inventive apparatus

FIG. 6 is illustrative of procedures suitable for apparatus fabrication, and

FIG. 7 is illustrative of equipment suitable for use in apparatus fabrication.

DETAILED DESCRIPTION

As discussed, this invention involves an apparatus suitable for viewing a rearward image using at least two mirrors, 1) each of the two having cylindrical symmetry and 2) having a substantially common plane of symmetry. The mirrors are further configured to provide in combination 1) an astigmatism of less than 0.0035, 2) an observable object field of at least 20 degrees, indeed even at least 25 degrees, and 3) a magnification over this field of view that has a ratio of local magnifications (a ratio between A) magnifications far from, relative to B) those close to the contemplated viewer's position) of less than 0.9. In this context, a mirror has cylindrical symmetry if there exists an imaginary plane (denominated the plane of symmetry) that has specific properties. In particular a plane is a plane of symmetry if the intersection of the plane of symmetry (which subsumes planes parallel to this plane) produces curves of intersection with the light-incident surface of the mirror such that these curves are essentially identical. (Essentially identical in this context involves a comparison of a group of these curves. Specifically, eleven of these curves at equally spaced intervals spanning the mirror in a direction perpendicular to the contemplated plane of symmetry are considered. These eleven lines together with the planes of intersection forming them are translated along a line perpendicular to the contemplated plane of symmetry until the intersecting planes coincide. Twenty equally spaced points are chosen spanning the entire length of the central line of the eleven initial lines. The distance from each of these 20 points on the central line to each of the remaining 10 lines is measured. (This measurement is made from each point in a direction that is perpendicular to the tangent to the central line at the point.) Then the curves are essentially identical if the average of these 200 measurements is less than 0.003 times the distance, in the final device, between the centroid of each of the two mirrors.

Figure 1:
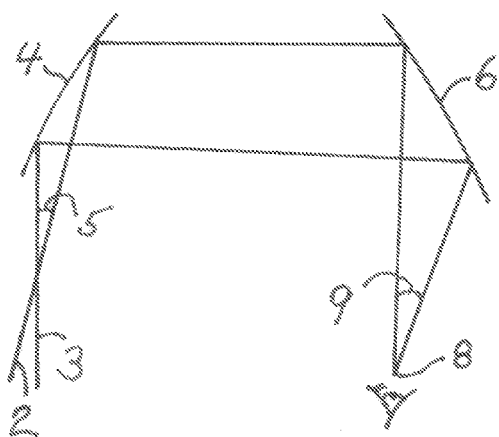

Further, in the final device, a plane of symmetry for one mirror should be substantially coincident with a plane of symmetry for the second mirror. Two planes are substantially coincident if the angle of intersection between the planes (if any) is one degree or less. As shown in FIG. 1, the two cylindrical mirrors are also disposed relative to each other such that an image field (represented by the angle 5 between light rays 2 and 3) is reflected from mirror 4 to mirror 6 and then to the observer's eye(s), 9 as shown at 8. However, it is not sufficient that the mirrors have a shape and a relative position such that a received image is merely present at the eye(s) of the observer.

The concept of at least two mirrors is central to the above discussion. In such context any region of the rearward looking apparatus upon which light from a rearward object is not ultimately reflected to a contemplated viewer is not considered part of the apparatus for purposes of mirror count and perimeter. Thus, for example, if a single reflective surface includes region 62 and 63 in FIG. 6 as well as a concave reflective region connecting the two, the configuration still satisfies the two mirror criterion. The concave region is not considered part of the apparatus since light is not reflected from this region ultimately to the position of a contemplated viewer. Because the concave region is not considered in determination of number of mirrors, the apparatus for purposes of the invention has two mirrors, one being the reflective surface in region 62 and the second being the reflective surface in region 63.

Figure 2:
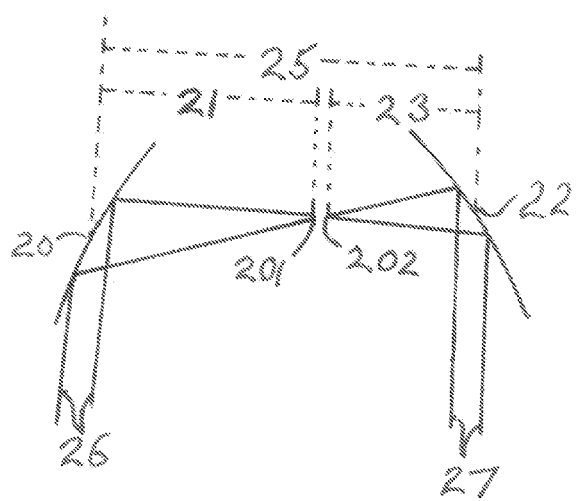

The advantages of a larger field of view that avoids a perceived image misrepresentation requires astigmatism characteristics meeting a specific criterion and magnification characteristics also meeting a specific criterion. Astigmatism is determined as illustrated in FIG. 2. The local (centered at 20 and 22) astigmatism, A, over the viewing region 26 is defined as:

$$A = \frac{|g - (a + b)|}{g}$$

where g is the distance 25, a is the distance 21, and b is the distance 23. (Lines 26 are parallel and lines 27 are parallel. Point 201 is the local focal point of the left mirror for lines 26 and point 202 is the local focal point of the right mirror for lines 27.) The required criterion concerning astigmatism is specified using this local definition of astigmatism. The centroid of the viewer mirror surface is determined. An imaginary line through this centroid and perpendicular to the mirror plane of symmetry is erected. The local astigmatism, A, at ten equally spaced points along the erected line is measured. Another ten local values of A are determined at equal spaced points along a line perpendicular to the plane of symmetry and passing through the halfway point (i.e. the point halfway between 1) the right side of the mirror and, 2) the centroid, such distance measured along the curve that is the intersection of the mirror surface and a plane of symmetry passing through the centroid. A further ten values of A are determined at equally spaced points along a line perpendicular to a plane of symmetry and half way (as determined on the right side) between the left side of the mirror and the centroid. The median value of A for these thirty measurements should be less than 0.0035, advantageously less than 0.003.

Figure 3:
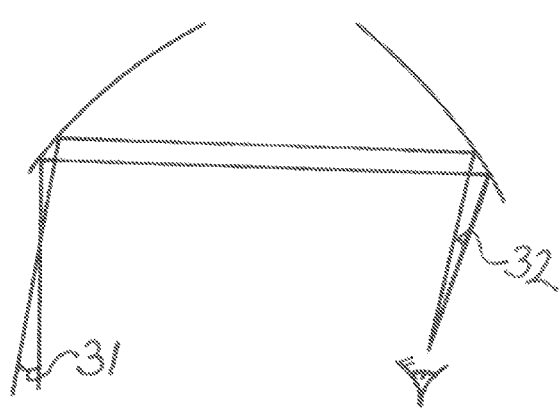

Local magnification is illustrated in FIG. 3. That is, the local magnification is the ratio of 1) the viewing angle 32 in degrees measured in a plane of symmetry to 2) the resulting observed angle 31 in degrees i.e. the field of view the image portion appears to subtend to the viewer. Using this local definition of magnification the required criterion concerning magnification is specified. In particular the local magnification is measured at 20 equal viewing angle increments across the entire field of view (along a direction parallel to the plane of symmetry of the mirrors). A median value is determined for the ten local magnifications that provide views farthest to the side of the contemplated viewer position and a median is determined for the ten local magnifications for the ten points closest to the view directly behind the contemplated viewer position. Then the ratio of the farther local magnification median to the closer should be less than 0.9. Indeed ratios less than 0.6 are possible.

Figure 4:
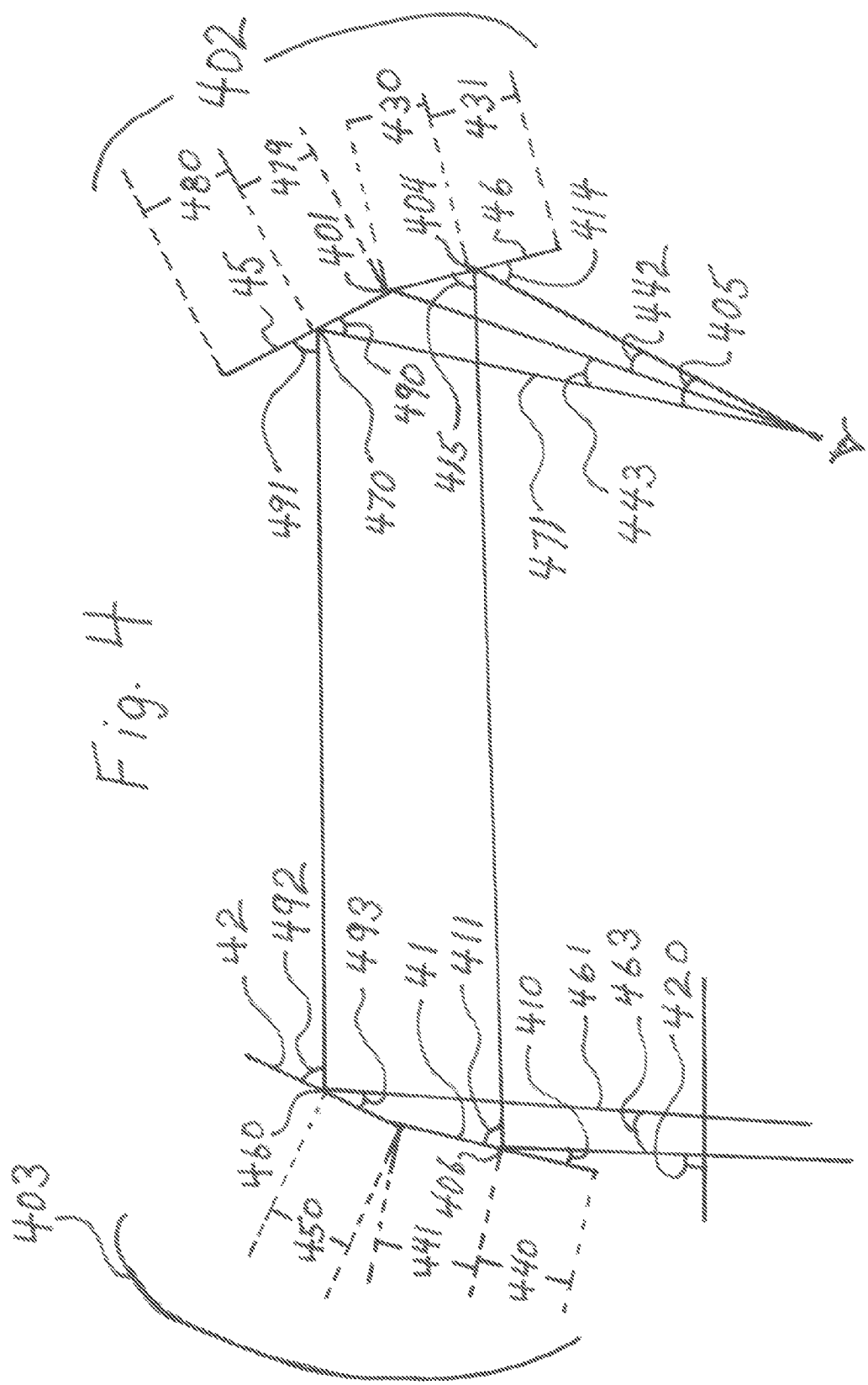

It is advantageous to design cylindrical lenses that satisfy the magnification and astigmatism criteria using an iterative procedure applied to a segmented representation of each cylindrical lens. (Although this procedure is advantageous other methods are not precluded.) Two suitable initial segments (41, 42, 46, and 45, respectively) of the cylindrical mirrors 402 and 403 for such design process are shown in FIG. 4. The position of midpoint 404 of segment 46 is determined by the desired size of the apparatus (fixing the distance between the cylindrical mirror, 403, and the point 404 as well as the position of the viewing structure e.g. eye(s) or photosensor) and by choosing viewing angle, 405, at a relatively small size—typically 1 percent, (e.g. 0.3 degrees) of the total desired object angle. Then the position of midpoint 406 of segment 41 is determined by the size of the apparatus and by setting angle 420 perpendicular to the contemplated lateral plane of the viewer's body. The angular disposition for segment 46 is set by angles 414 and 415 (that are equal angles of reflection) chosen so that light ray 421 reflects from point 406 and intersects point 404 (assuming no divergence of the light ray for the entire design procedure.) Similarly, equal angles 410 and 411 are set by requiring the angle 420 to be 90 degrees. The distance 430 is chosen to be equal to distance 431 so that point 404 is, in fact, the midpoint of segment 46. The point 401 that determines distance 479 is fixed by choosing equal angles 442 and 443 to be half of angle 405. Distance 441 is chosen equal to distance 440 so that point 406 is the midpoint of segment 41 and further distances 440 and 441 are chosen equal to distance 450. Point 460 and thus distance 450 is determined by light ray 461 that propagates at an angle 463 that is equal to angle 405.

Continuing in the same vein, the midpoint 470 of segment 45 is set by light ray, 471 disposed at angle 405. Distance 479 is therefore equal to distance 480. All the above ascertained distances and angles, in turn, set equal reflective angles 490 and 491 as well as equal reflective angles 492 and 493.

By the above process the first two segments of two mirrors are chosen. Having chosen the initial segments the remaining segments of the cylindrical mirrors are determined by an iterative procedure illustrated in FIG. 5. Specifically, parallel light rays 502 and 503 are constructed to intersect respectively midpoints 51 of second segment 54 and midpoint 52 of third segment 53. Parallel light rays 504 and 506 are constructed to intersect midpoint 56 of first segment 58 and midpoint 57 of second segment 59. Light ray 511 is determined by choosing angle 510 equal to the angle 405 of FIG. 4 set as previously described. By choosing light ray 515 from midpoint 55 to impact midpoint 52 of segment 53 the size and angular disposition of third segments 501 and 53 are correspondingly fixed. The iterative process is continued by first defining segment 545 with corresponding midpoint 540 with the same parallel ray method as previously described but this time referencing segment 59 with corresponding midpoint 57. Then segment 530 with corresponding midpoint 535 is defined setting 570 equal to 510 (in turn equal to 405 in FIG. 4). (It is assumed for each mirror segment the angle of incidence of a ray is equal to the angle of reflection.) For subsequent segments, the nth segment of the left mirror is defined using the parallel ray method from the (n−2)th segment of the right mirror or viewing mirror. This is then followed by defining the nth segment of the right mirror consistently choosing equal angular increments of rays to the eye from each right mirror segment midpoint.

The iterative process continues until sufficient incremental angles equivalent to angle 405 and corresponding segments are appended to produce the desired object angle of 20 degrees or greater. (For purposes of this description, the iterative process described to produce the desired viewing angle is considered the first iteration.) The second iteration is performed as was the first but an incremental angle equivalent to half of angle 405 is used. The generated mirrors from two sequential iterations are then compared. Differences of mirror segment positions at the two ends and the center of the mirror segments are then calculated and the average of the absolute values of these differences is calculated. When this average difference from one iteration to the next is less than 0.01 mm and preferably less than 0.005 mm, then the iterations are stopped and the last iteration is used as the final calculation. Further iterations are not precluded but typically do not significantly improve the optical characteristics of the inventive rearward-looking apparatus.

The described iterative method of calculating mirror segments relies on odd numbered segments being calculated based on the previous odd numbered segment and even numbered segments based on the previous even numbered segment. It is possible that an initial unequal size of the odd and even segments of the left mirror then continue on iteration to become more unequal and eventually to cause the calculation of a left mirror segment with a length less than zero. If even, left mirror line segments continue to decrease in size relative to odd segments, a suitable approach to avoid vanishing segments involves increasing by a small amount, e.g. 20 percent of the line segment length, the even left mirror segment and then subtracting this small amount from the next odd segment. This method of stabilizing line segment generation has been found not to affect unacceptably the accuracy of the final result. Alternatively, or additionally, changing the initial two postulated segment lengths by up to 30 percent makes it possible to decrease the initial unequal sizes of the odd and even segments.

By using the previously described iterative process a series of two dimensional coordinates for each mirror is generated. Since the mirrors are cylindrically symmetric, the two dimensional plots define for design purposes all three dimensions of each mirror. (In specifying the mirror the first two segments shown in FIG. 4 at 41 and 42 as well as 45 and 46 of each mirror are discarded because they are postulated without regard to the parallel ray approach that maintains the astigmatism limitation.) The resulting coordinates define the surface of the mirrors upon which light to be viewed is incident.

A variety of approaches is possible for fabricating a structure having the mirror characteristics described above. The generic invention involving two cylindrically symmetric mirrors having specific astigmatism and magnification properties is not limited by the particular fabrication approach. However, it has been found that forming the mirror apparatus by conforming thin flexible mirrors to a suitably shaped structure lends itself to producing the inventive apparatus. In general, a deformable mirror structure is pressed into a structure 61 in FIG. 6 having shapes 62 and 63 that are configured to produce the desired mirror configuration (mirror shapes and relative position) once the flexible mirrors are adhered conformably to the mirror accepting shapes.

It is possible to employ various materials for the structure 61. The material however should advantageously have a compressive strength in the range 40 to 100 psi as measured by the American Society for Testing and Materials (ASTM) method D1621. It is also advantageous for the material to have a compressive modulus in the range 1400 to 3700 psi as measured by ASTM D1621, and a coefficient of linear thermal expansion no larger than $3.5 \times 10^{-5}$ in/(in x degrees Fahrenheit) as measured by ASTM D696. One material having the above specified properties is a closed cell extruded polystyrene (XPS) sold in two inch thick sheets by Dow Chemical Co., South Saginaw Road, Midland, Mich. 48640 and denominated STYROFOAM™ Highload 100 insulation. If a material having a thickness greater than two inches is desired, it is possible to laminate the material using an epoxy adhesive to form larger blocks. One suitable epoxy is West System's 105 Epoxy Resin and Hardener mixed in a ratio of 5 parts resin to 1 part hardener.

It is possible to form the desired mirror bearing surfaces, 63 and 62, by various approaches. For example, a numerically controlled cutting device is employable for such purpose. In another approach a template corresponding to the desired mirror shape is formed and is used in conjunction with a pantograph/milling machine combination. Alternatively, a hot wire cutter whose motion is constrained by a template is employable. It has been found, however, that it is particularly effective to employ a template together with a tracing router bit associated with a table mounted woodworking router.

As shown in FIG. 7 a router is mounted to a table having a flatness of to within 0.003 inches so that a tracing router bit 71 inserted into the router tool holder projects through and perpendicular to the table. The router bit 71 has a mounted bearing 74 where the bearing has the same diameter (within 0.0005 inches) as the area defining the cutting region of the bit. (A suitable template router bit having a diameter in the range 0.750 inches to 0.875 inches is manufactured by Whiteside Machine Co., 4506 Shook Rd., Claremont, N.C. 28610.) The template material 76 is mounted to the supporting structure 77 so that when the template is presented to the bearing the two dimensional template configuration is transferred as a three dimensional region of cylindrical symmetry to the supporting structure.

The material used for the template should have a Rockwell Hardness as defined and measured by ASTM D785 of between 30 and 105, preferably between 80 and 105. It is further desirable for the template material to have a deflection temperature under a 66 pounds per square inch load as defined by ASTM D648 of greater than 160 degrees F. and preferably greater than 200 degrees F. By satisfying this latter requirement, the stability of the template remains well within desired limits if used within 5 degrees F. of 70 degrees F. Suitable template materials include steel, brass, bronze and polycarbonate material. However, the use of a stable polymer material such as polymethylmethacrylate (PMMA) with a thickness in the range 0.1 to 0.5 inches preferably in the range 0.2 to 0.30 inches allows relatively simple fabrication. This material should advantageously have a Young's modulus of 1800 to 3100 Mpa, a compressive strength of 83 to 124 Mpa and a coefficient of thermal expansion of $50 \times 10^{-6}$ to $90 \times 10^{-6}$ per degree K. The template is advantageously formed in the PMMA using suitably adjusted coordinates calculated in accordance with the above described iterative process. It is preferable to fabricate the template so it includes both mirror surfaces to be produced in the supporting material. In this manner, the configuration of the two mirrors relative to each other is set. The calculated coordinates are adjusted for 1) the beam kerf of a laser cutting system, e.g. a $CO-CO_2$ laser cutting system and for 2) the thickness of the mirror material, so that upon attachment of the mirror material to the supporting structure the outward facing mirror surface has the above calculated coordinate configuration. Typically, the beam width of the system is set in the range 0.001 to 0.01 inches (e.g. 0.002 inches) and results in a cutting kerf in the range 0.005 to 0.01 inches e.g., 0.006 inches. (A suitable laser cutting system is sold by Universal Laser Systems, 7845 East Paradise Lane, Scottsdale, Ariz. 85260.)

A template is made not only to produce surfaces 62 and 63 of the supporting structure but also to produce a second structure that conforms to the desired outward facing shape of the mirrors in their final configuration. This latter template is used to form a pressure block employed during fabrication to force the mirrors into close contact with surfaces 62 and 63. In one convenient approach the same material as employed in the supporting structure is formed using this second template. In essence, the block produced using the second template is the negative of the surfaces of the supporting structure with adjustment for the thickness of the mirrors.

The mirror material generally has a thickness in the range of 0.025 to 0.06 inches. The mirror material should further have the property that when bent to conform to the shape of the designed mirror, it maintains a cylindrically symmetric shape. One suitable mirror material is a 0.001 inch polyester front surface mirror laminated to 0.04 inch thick polystyrene. (Such mirror material is sold by American Acrylics, 8124 Central Park Avenue, Skokie, Ill. 60076.) This mirror material, however, is not sufficiently flexible to be bent directly into the monolithic structure without unacceptable distortion. Such distortion is avoided by prebending the mirror. A length of mirror material of suitable size is cut to fit into a cylindrical form (denominated a preform structure) having diameter approximately 15% less than a least square cylinder fit to the final two dimensional configuration of the mirror. (A separate cylindrical preform is made for each of the two mirrors.) The preforming structure is advantageously produced using a thin steel cylinder. The mirror material is placed into the form and heated for a sufficient time at a sufficient temperature to allow preforming and ultimately the final shaping of the material. The heating should be done at a temperature below the glass transition temperature of the mirror backing material e.g. polystyrene. Since polystyrene has a glass transition temperature of approximately 100 degrees C. one suitable approach is to place the material into the preforming structure and heat the combination by immersion in water having a temperature in the range 85 to 95 degrees C. e.g. 90 degrees C. for a time period in the range 15 to 60 seconds e.g. 30 seconds. The preforming treatment should be such that when the preformed mirror is placed against the supporting structure at the final mirror surfaces, the center of the mirror material before application of pressure is less than 1.5 mm from the center of its corresponding supporting structure surface.

A suitable adhesive is used to bond the mirrors to the supporting structure. For example, an epoxy resin with a catalyst is used. It is desirable for the adhesive to have a viscosity after mixing in the range 700 to 1200 e.g. 975 centipoise measured according the ASTM D2393. A viscosity in this range allows the mirror surfaces to be coated with a thin, just visible layer. The back surfaces of the mirrors are coated with such a layer, the mirrors are placed in the desired position against the supporting structure, and pressure is applied using the previously described block fabricated for this purpose. The adhesive should be allowed to cure between 5 and 10 hours e.g. 7 hours. Faster cure times typically result in unacceptably weak bonds. It is desirable that the adhesive after curing have a tensile strength greater than 5000 psi and preferably greater than 7800 psi. (One suitable epoxy is West System's 105 Epoxy Resin and Hardener mixed in a ratio of 5 parts resin to 1 part hardener.) Because the XPS is relatively porous, the epoxy adhesive after curing occupies essentially no thickness between the mirror and the supporting structure.

If desired, it is possible to coat the non-optical surfaces of the formed apparatus with a protective layer. (One suitable material is Styrospray 1000 from Industrial Polymers Corp., 3250 South Sam Houston Parkway East, Houston, Tex. 77047.) Alternatively, the West System 105 epoxy resin is mixed in a 20:1 ratio with titanium white pigment from Winston Oil Color, 11 Constitution Ave., Piscataway, N.J. 08854 to produce a coating material.

Distortion introduced by the fabrication process should not cause the final apparatus to have astigmatism (or deviation from cylindrical symmetry) greater than that previously specified. Thus, contributions to the cylindrical symmetry distortion should advantageously be limited as follows:

Original mirror flatness≤0002 mm
Forming of mirror shape in XPS≤0.001 mm
Gluing process≤0.0002 mm and contributions to astigmatic mirror distortion should advantageously be less than:

Original mirror flatness≤0002 mm
Forming of mirror shape template≤0006 mm
Forming of mirror shape in XPS≤004 mm
Gluing process≤0.0002 mm It is possible to mount the device in a variety of configurations. For example, the apparatus is attached by magnets or a hook and loop structure to a safety helmet such as worn when riding a bicycle. The apparatus is thus adjustable by sliding it along the edge of the helmet. The apparatus is also attachable to the underside of a cap or to a visor attached to the head using an elastic structure. For such cap or visor the mirror structure is advantageously attached to an intermediate structure so that it is rotatable around an axis perpendicular to a mirror plane of symmetry. This axis is advantageously placed close to the center of the viewing mirror. The apparatus further is attachable to a vehicle in much the same manner as current single mirrors are mounted. However, the apparatus is viewable with both eyes and the object mirror need not extend significantly beyond the widest point of the vehicle.

Depending on the application, the bottom edge of the mirrors might not be required for the image to be viewed. It is thus possible to truncate the mirrors to eliminate unnecessary mirror regions. While the axis of symmetry is typically positioned vertically providing a demagnified view at the outer edge, there are, at times, practical advantages to tilting this axis. For example, if the eye mirror is slightly above the viewer's eye then the plane of symmetry is advantageously tipped so that it goes through the viewer's eye and also goes through the top of the mirrors. While for pedagogic reason the right mirror has been described and configured as the viewing mirror, the opposite is also possible.

What is claimed is:

1. An apparatus comprising a first cylindrically symmetric mirror and a second cylindrically symmetric mirror, said first mirror and said second mirror oriented so that a symmetry plane of said first mirror substantially coincides with a symmetric plane of said second mirror and so that light over a field of at least 20 degrees incident on said first mirror is reflected onto said second mirror and reflected from said second mirror so that it is observable wherein said first and second mirrors have a shape such that 1) the astigmatism of said apparatus is less than 0.0035 and 2) the ratio between A) the far field magnification and B) the near field magnification is less than 0.9.

2. The apparatus of claim 1 wherein the ratio between said far and near field magnification is less than 0.6.

3. The apparatus of claim 1 wherein said astigmatism of said apparatus is less than 0.003.

4. The apparatus of claim 1 wherein said first and second cylindrically symmetric mirrors comprise a surface reflecting polymer.

5. The apparatus of claim 4 wherein said polymer comprises a polyester polymer.

6. The apparatus of claim 4 wherein said polymer is conformally adhered to an appropriately configured structure.

7. The apparatus of claim 6 wherein said structure comprises polystyrene.

8. The apparatus of claim 1 including a structure suitable to promote mounting on a vehicle.

9. The apparatus of claim 1 including a structure suitable to promote mounting on a helmet.

10. The apparatus of claim 1 including a structure suitable to promote mounting on a visor of a cap.

11. The apparatus of claim 1 wherein said light over a field of at least 25 degrees is reflected onto said second mirror so that it is observable.

12. A process for fabricating an apparatus comprising the steps of 1) shaping a structure to have a first and second cylindrically symmetric concave surface such that a plane of symmetry for said first surface substantially coincides with a plane of symmetry of said second surface 2) applying force to a first and a second mirror to induce conformation of said first mirror to said first surface and conformation of said second mirror to said second surface such that the reflective surface of said first and second mirror are sufficiently flexible to allow said conformation, and wherein said surfaces are configured in said shaping step such that the astigmatism of said apparatus is smaller than 0.0035 and the ratio between the far field and near field magnification is less than 0.9.

13. The process of claim 12 wherein said first and second mirrors comprises a polyester polymer.

14. The process of claim 13 wherein said structure comprises polystyrene.

15. The process of claim 12 wherein said structure comprises polystyrene.

* * * * *